Patented June 27, 1933

1,915,334

UNITED STATES PATENT OFFICE

PAUL LAWRENCE SALZBERG AND EUCLID WILFRED BOUSQUET, OF WILMINGTON, DELAWARE, ASSIGNORS TO E. I. DU PONT DE NEMOURS & COMPANY, OF WILMINGTON, DELAWARE, A CORPORATION OF DELAWARE

FLUOSILICATE OF ORGANIC HETEROCYCLIC BASES AND PROCESS OF MAKING IT

No Drawing. Application filed October 16, 1930. Serial No. 489,231.

This invention relates to new compounds consisting of organic fluosilicates, and more particularly to the fluosilicates of heterocyclic bases.

It is known that some of the organic aromatic bases react with hydrofluosilicic acid to give well defined crystalline salts of the general formula $R_2.H_2SiF_6$, where R equals the organic residue containing one basic nitrogen atom. Jacobson and Pray have described the preparation and some properties of the fluosilicates of aniline, mono-methyl aniline and o-, m-, and p-toluidine (J. A. C. S. 50, 3055 (1928)); Elber and Schott reported similarly on the fluosilicates of hydroxylamine (J. pr. Ch. (2), 78,338 (1908)) and hydrazine (J. pr. Ch. (2) 81,552 (1910)). The production of fluosilicates of heterocyclic bases, and the mode herein disclosed of preparing these fluosilicates is, however, believed to be new.

This invention has as an object the production of new compounds consisting of fluosilicates of heterocyclic bases. A further object is the production of fluosilicates of this class which are water soluble. A still further object resides in the method of preparing the above referred to fluosilicates of organic heterocyclic bases.

These objects are accomplished by the following invention in which organic heterocyclic bases, containing a basic nitrogen atom as a member of the heterocyclic rings, are reacted in the presence of water with hydrofluosilicic acid, and the fluosilicate appropriately separated from its aqueous solution in the reaction mixture.

With respect to the general method of preparing these fluosilicates of heterocyclic bases we prefer to react, below 60° C., the approximately 30% aqueous hydrofluosilicic acid of commerce and the heterocyclic base in equivalent or neutralizing amounts. Evaporation of the mixture at room temperature, preferably over sulfuric acid in a vacuum desiccator, yields the pure white crystalline organic fluosilicate. In some cases, it becomes practical to precipitate most of the organic fluosilicate from the aqueous reaction mixture by the slow addition of ethyl alcohol or acetone.

The following specific examples are illustrative of the method of preparing our new compounds.

EXAMPLE 1

Pyridine fluosilicate

Twenty-five hundredths mole (117.2 g.) of 30.7% hydrofluosilicic acid was mixed with a sufficient quantity (about 0.5 mole) of pure pyridine to render the final solution exactly neutral using dimethylaminoazobenzene as an outside indicator. Evaporation of the aqueous reaction mixture at room temperature over sulfuric acid in a vacuum desiccator gave 65 g. of a pure white crystalline product melting with the evolution of a gas at 154–7° C. (uncorrected). The compound is very soluble in water, insoluble in ether and benzene, and only very slightly soluble in absolute ethyl alcohol. It volatilizes above 110° C. and absorbs moisture from the air quite readily.

EXAMPLE 2

Piperidine fluosilicate

A fine white crystalline precipitate was obtained upon addition of 75 cc. of acetone to an aqueous solution of piperidine fluosilicate made by treating 0.2 mole (16.8 g.) of piperidine with 0.1 mole (46.9 g.) of 30.7% hydrofluosilicic acid while keeping the temperature below 55° C. The yield amounted to 67.3% of the theoretical amount. The compound is very soluble in water and absolute ethyl alcohol but insoluble in ether and acetone. It is very hygroscopic and melts at 209–17° C. (uncorrected).

EXAMPLE 3

Quinoline fluosilicate

One-tenth mole (12.9 g.) of synthetic quinoline was slowly poured into 0.05 mole (23.45 g.) of 30.7% fluosilicic acid with the temperature below 55° C. One hundred cc. of absolute ethyl alcohol was added to the cold reaction mixture and the fine white needles that separated were filtered, washed with alcohol and with ether, and dried over sulfuric acid in a desiccator. A yield of 18.7 g. was obtained. The salt is very soluble in water and insoluble in alcohol, acetone, benzene, and ether. It volatilizes at 110° C. and melts at 156-60° C. (uncorrected). This salt crystallizes with 1 molecule of water of crystallization.

EXAMPLE 4

*P-phenetyl aminothiazole fluosilicate*

A solution of 100 cc. of absolute ethyl alcohol and 0.1 mole (19.5 g.) of p-phenetyl aminothiazole was gently heated with 0.05 mole (23.45 g.) of 30.7% fluosilicic acid. The white crystalline precipitate was filtered, washed with ether and dried. The yield was 97% of the theoretical amount. The compound is insoluble in most organic solvents, and only slightly soluble in water. It does not melt below 230° C.

EXAMPLE 5

*Nicotine fluosilicate*

One-tenth mole (16.2 g.) of nicotine was slowly poured into 0.1 mole (46.9 g.) of 30.7% hydrofluosilicic acid with the temperature below 55° C. Evaporation of the aqueous reaction mixture in a vacuum desiccator over phosphroic anhydride gave a crude white product which was washed with absolute ethyl alcohol and with ether. A yield of 28 g. of pure white, hygroscopic crystals were obtained. The compound is very soluble in water and insoluble in ether and benzene.

The fluosilicates of organic heterocyclic bases are in general white crystalline solids readily soluble in water. They melt at fairly high temperatures, although rather volatile around 100° C., and some of them sublime. Analyses of these organic fluosilicates show that they possess the general formula $R_2.H_2SiF_6$, where R represents a molecule of an organic heterocyclic base containing one basic nitrogen atom as a member of the heterocyclic ring.

While it is to be understood that the present invention is not dependent or limited by the accuracy of the formulæ used to represent our new compounds, it may be noted that where the heterocyclic base contains a plurality of basic nitrogen atoms in the molecule, as for instance the nicotine mentioned, the formula may be more generally expressed as

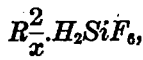

wherein R is a heterocyclic basic nitrogen compound, and $x$ the number of basic nitrogen atoms utilized for the formation of the fluosilicate.

When the base contains a plurality of nitrogen atoms in the molecule, several possibilities exist. For instance, if two nitrogen atoms are present in each molecule of the heterocyclic base, the $H_2SiF_6$ group may be connected to one nitrogen atom of one molecule of the base and to one nitrogen atom of another molecule of the base, or both nitrogen atoms of one molecule of the base may be connected to the hydrofluosilicic acid group, or two molecules of the acid group may connect two molecules of the base one molecule of the acid connecting a nitrogen atom of one molecule of the base with a nitrogen atom of the other molecule of the base and the other acid molecule likewise connecting the two remaining nitrogen atoms.

Our invention comprehends all organic heterocyclic bases with a sufficiently basic nitrogen atom to react with hydrofluosilicic acid. As examples of other heterocyclic bases that could be used, we might mention picoline, lutidine, collidine, isoquinoline, quinaldine, naphthoquinaldine, acridine and carbazole. Furthermore, crude coal tar bases may be employed. These bases may be partially or wholly hydrogenated as exemplified by piperidine mentioned in the examples, or by pyrrolidine, or alkyl pyrrolidines. By the term heterocyclic bases, we mean to include also molecules having other functional groups, or other hetero-atoms besides the basic heterocyclic nitrogen atom, such as morpholines, thimorpholines, and thiazoles. We may also use heterocyclic compounds having more than one basic nitrogen atom such as piperazines, naphthyridines, and the dipyridyls.

While it is preferred to carry out the reaction between the heterocyclic base and hydrofluosilicic acid at a temperature below 60° C., or more specifically about room temperature, a wider range of temperature may be used, the highest temperature being limited by the boiling point of the aqueous mixture, or by the temperature that the organic fluosilicate decomposes. It is convenient to use commercial hydrofluosilicic acid which is about 30% strength, but as long as the acid solution is not too dilute, other concentrations up to 100% may be used. An aqueous solution of those basic nitrogen compounds soluble in water may be reacted with hydrofluosilicic acid. The water present in the commercial acid is, however, sufficient to carry out the reaction.

The compounds and compositions containing them are useful as wood-preservatives, disinfectants, and antiseptics.

The organic fluosilicates of the present invention are easily prepared white, crystalline, non-inflammable solids, soluble in water, practically odorless and non-corrosive.

As many apparently widely different embodiments of this invention may be made without departing from the spirit and scope thereof, it is to be understood that we do not limit ourselves to the specific embodiments thereof except as defined in the appended claims.

We claim:

1. A fluosilicate of an organic heterocyclic base containing at least one nitrogen atom as a member of the heterocyclic ring.

2. A water soluble fluosilicate of an organic heterocyclic base containing at least one nitrogen atom as a member of the heterocyclic ring.

3. A fluosilicate having the probable general formula of $$R_{\frac{2}{x}} \cdot H_2SiF_6,$$

wherein R is a heterocyclic basic nitrogen compound, and $x$ the number of basic nitrogen atoms in each molecule of the basic nitrogen compound which are utilized for the formation of the fluosilicate.

4. An organic fluosilicate consisting of the reaction product of hydrofluosilicic acid with an organic heterocyclic base containing at least one nitrogen atom as a member of the heterocyclic ring.

5. A process which comprises reacting hydrofluosilicic acid with an organic heterocyclic base containing at least one nitrogen atom as a member of the heterocyclic ring.

6. A process which comprises reacting together hydrofluosilicic acid and an organic heterocyclic base in the presence of water, and separating the organic heterocyclic fluosilicate formed from the aqueous reaction mixture.

7. A process which comprises reacting together hydrofluosilicic acid and an organic heterocyclic base in the presence of water, below 60° C., and separating the organic heterocyclic fluosilicate formed from the aqueous reaction mixture.

8. A process which comprises reacting together hydrofluosilicic acid and an organic heterocyclic base in equivalent amounts.

In testimony whereof we affix our signatures.

PAUL LAWRENCE SALZBERG.
EUCLID WILFRED BOUSQUET.